United States Patent [19]

Machon

[11] 4,298,717
[45] Nov. 3, 1981

[54] ETHYLENE POLYMERIZATION PROCESS

[75] Inventor: Jean-Pierre Machon, Bethune, France

[73] Assignee: Societe Chimique des Charbonnages-CdF Chimie, Paris la Defense, France

[21] Appl. No.: 929,952

[22] Filed: Aug. 1, 1978

[30] Foreign Application Priority Data

Aug. 1, 1977 [FR] France .............................. 77 23652

[51] Int. Cl.$^3$ .......................... C08F 2/02; C08F 2/06; C08F 10/02
[52] U.S. Cl. .................................... 526/124; 526/114; 526/116; 526/119; 526/121; 526/128; 526/142; 526/155; 526/902
[58] Field of Search ............... 526/119, 124, 128, 142, 526/65, 114, 116, 121, 155

[56] References Cited

U.S. PATENT DOCUMENTS

| | | | |
|---|---|---|---|
| 2,956,993 | 10/1960 | Nowlin et al. | 526/124 |
| 3,058,972 | 10/1962 | Fourcad et al. | 526/128 |
| 3,061,602 | 10/1962 | Duck et al. | 526/119 |
| 3,629,212 | 12/1971 | Benedikter et al. | 526/65 |
| 3,929,754 | 12/1975 | Gloriod et al. | 526/119 |
| 4,133,944 | 1/1979 | Cooper et al. | 526/65 |

FOREIGN PATENT DOCUMENTS

| | | | |
|---|---|---|---|
| 2342306 | 9/1977 | France | 526/125 |
| 475368 | 9/1975 | U.S.S.R. | 526/119 |

Primary Examiner—Edward J. Smith
Attorney, Agent, or Firm—Finnegan, Henderson, Farabow, Garrett & Dunner

[57] ABSTRACT

A process for polymerizing ethylene under high pressure and temperature in at least one reactor having at least one reaction zone. A catalyst system is used that comprises (a) an activator selected from trialkylaluminums, hologenodialkylaluminums, and alkylsiloxalanes, (b) a halogen compound of a transition metal of groups IV to VI A, and (c) a complexing agent that is injected into the reactor in such a manner that its concentration in the reactor may be adjusted independently from the concentration of (b). The complexing agent may be selected from silicone oils and from compounds having the formula $X(OR)_n$, wherein X is hydrogen or a metal, n is the valence of X, and R is an alkyl radical of up to 20 carbon atoms.

8 Claims, 1 Drawing Figure

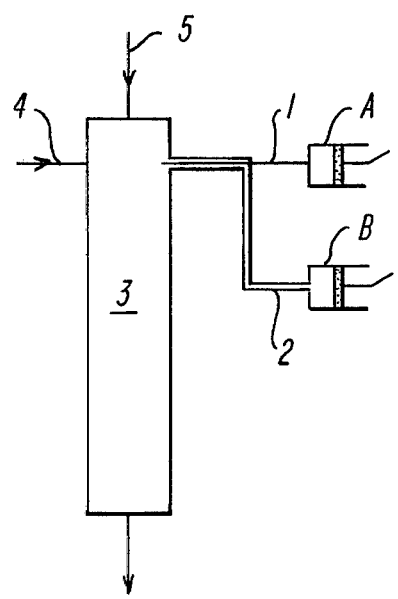

ETHYLENE POLYMERIZATION PROCESS

BACKGROUND OF THE INVENTION

The invention relates to a process for manufacturing high-density polyethylene and, more precisely, to a controlled process for polymerizing ethylene by separate injection of catalytic components.

When shaping high-density polyethylene by blow molding, it is essential that the polymer have a broad molecular weight distribution and a proportion of very high molecular weights as high as possible. When high-density polyethylene was manufactured according to to the high-pressure process, e.g. in British Pat. Nos. 1,441,115, 1,441,117 and 1,482,444, this problem was difficult to solve whatever catalytic components were used for the polymerization.

The use of complexing agents to modify molecular weight distribution is already known in the manufacture of high-density polyethylene according to the low pressure (less than 100 bars) and low temperature (less than 180° C.) process, in which the complexing agent is injected into the reactor together with the other catalytic components. The technique of U.S. Pat. No. 3,929,754 is also known, according to which ethylene is polymerized at high temperature and under high pressure by means of a Ziegler-type catalyst comprising a titanium alcoholate and/or silicon oil. The art has not, however, solved the problems that this invention is concerned with.

SUMMARY OF THE INVENTION

A first object of the invention is therefore to provide a means for obtaining, according to the high pressure process, a high-density polyethylene that can be shaped by blow molding. A second object of the invention is to provide a practical method for achieving the aforesaid object that improves existing processes without requiring an additional investment that is too large.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the process of the invention comprises polymerizing ethylene under a pressure of 400 to 2,500 bars and a temperature of 200° to 350° C., in at least one reactor comprising at least one reaction zone, by means of a catalyst system comprising (a) an activator selected from trialkylaluminums, halogenodialkylaluminums and alkylsiloxalanes, and (b) a halogen compound of a transition metal of groups IV to VI A, wherein a complexing agent (c) is injected into the reactor in such a manner that its concentration in the reactor may be adjusted independently from the concentration of (b) in the same reactor. The complexing agent is selected from silicone oils and from compounds having the formula $X(OR)_n$ wherein X is hydrogen or a metal, n is the valence of X, and R is an alkyl radical of up to 20 carbon atoms.

A preferred embodiment of this process comprises injecting the complexing agent (c) separately from the component (b) of the catalytic system. This may be achieved by injecting (c) into a different reaction zone from that where the component (b) is injected. This may even be achieved by injecting (b) and (c) into the same reaction zone by using an injection device in which the feeding line of (c) terminates in the reaction zone concentrically to the feeding line of (b). The preferred compound (b) used according to the invention is titanium trichloride. The catalysts are preferably dissolved or dispersed in an inert diluent; they may be injected in the different zones of the reactors.

According to a further preferred embodiment of this process, the amount of the complexing agent will be such that the ratio of the molar flow rate of (c) to the molar flow rate of the transition metal of compound (b) is between 0.15 and 4.

The invention consists in the novel parts, constructions, arrangements, combinations and improvements shown and described. The accompanying drawing, which is incorporated in and constitutes a part of this specification, illustrates one embodiment of the invention and, together with the description, serves to explain the principles of the invention.

BRIEF DESCRIPTION OF THE DRAWING

The FIGURE is a diagrammatic sketch of a reaction zone illustrating a device for carrying out the process according to the invention.

DESCRIPTION OF THE PREFERRED EMBODIMENTS

Reference will now be made in detail to the present preferred embodiments of the invention, an example of which is illustrated in the accompanying drawing.

Among the complexing agents of the invention are heavy alcohols, alcoholates of magnesium, sodium, calcium, zinc, aluminum, germanium, tin, zirconium, hafnium, antimony, tantalum, titanium, thorium, and uranium, alkylsilicates, alkyl- and arylsiloxanes, and alkylcyclosiloxanes.

A preferred device for carrying out the invention is shown in the FIGURE. The device comprises a pump B fed with a catalyst, a feeding line 2 joining pump B to a reaction zone 3, a pump A fed with a complexing agent, and a feeding line 1 joining pump A to the same reaction zone 3 and terminating in the zone concentrically to the feeding line 2.

The compound (b) used according to the invention may be fixed on a support. Preferred compounds are π-allyl and π-benzyl complexes of chromium, zirconium and titanium, as well as titanium trichloride which may be syncrystallized with aluminum chloride and/or supported on magnesium chloride.

The present invention is applicable not only to the polymerization of ethylene, but to the copolymerization of ethylene with α-olefins such as propylene and butene-1, and to the terpolymerization of ethylene with an α-olefin such as propylene and with a non-conjugated diolefin. As already known, one or several chain transfer agents, such as, e.g. hydrogen, may be used in the process of the invention in order to regulate and control the polymer characteristics. The reaction mixture may further comprise an inert diluent such as a hydrocarbon (e.g. propane or butane) in a proportion of up to 50 percent by weight of the gaseous mixture.

In the process according to the invention, the residence time of the ethylene in each reaction zone is, in a known manner, comprised between 1 and 120 seconds. The steps of decompressing the reaction mixture, separating the unreacted ethylene from the polymer, recycling the separated ethylene, and so on, are effected according to the previously known methods.

The invention will be better understood by reference to the following nonlimiting examples.

EXAMPLES 1 AND 2 (COMPARATIVE)

Ethylene is polymerized in an autoclave reactor comprising a single zone having a capacity of 0.9 liter, under a pressure of 1,500 bars and at a temperature T° C. (indicated in Table I below). The residence time of ethylene in the reactor is 30 seconds. The catalytic system comprises on the one hand the compound, $TiCl_3, \frac{1}{3} AlCl_3$ and on the other hand trioctylaluminum as activator in such amount that the atomic ratio Al/Ti is 3.

Polymerization is effected in the presence of hydrogen in a proportion h by volume (indicated in Table I). The polymer obtained had been characterized by its specific gravity $\rho$ (in g/cm$^3$), melt index MI (measured in g/10 mn according to ASTM 1238-62 T), weight average molecular weight $M_w$ (measured by means of gel permeation chromatography), polydispersity index $M_w/M_n$ (indicating the broadness of the molecular weight distribution, $M_n$ being the number average molecular weight), and the proportion B of molecular weights under 5,000.

EXAMPLES 3 TO 6

Ethylene is polymerized under conditions identical to those of Examples 1 and 2. However, an injection device like that shown in the FIGURE is used for injecting into the reactor a complexing agent c, the nature and molar ratio to titanium (noted c/b) of which are indicated in Table II below. The polymers obtained have been characterized according to the manner set forth in Examples 1 and 2.

It will be noticed that, every polymerization condition being otherwise identical, the separate injection of complexing agents according to the invention permits decreasing B and $M_w/M_n$ (except for Example 4) and increasing $M_w$ by 30 to 60 percent.

EXAMPLES 7 AND 8 (COMPARATIVE)

Ethylene is polymerized in a three-zone autoclave reactor having a capacity of 3 liters, under a pressure of 1,200 bars, in the presence of hydrogen in a proportion h by volume (indicated in Table III below) and of 3 percent by weight propane. Temperatures of the three different zones have been respectively designated by $T_1$, $T_2$, and $T_3$ and indicated in Table III.

The ethylene flow rates feeding the various zones represent respectively 30%, 35%, and 35% of the total ethylene flow rate feeding the reactor. Into zone 1 (at temperature $T_1$) is injected a catalytic system comprising $TiCl_3, \frac{1}{3} AlCl_3$ and a trioctylaluminum activator, the atomic ratio Al/Ti being 3. No catalyst is injected into zone 2. Into zone 3 (at temperature $T_3$) is injected a catalytic system comprising on the one hand the compound $TiCl_3, \frac{1}{3} AlCl_3$, 6 $MgCl_2$ obtained by cogrinding of anhydrous magnesium chloride and of titanium trichloride syncrystallized with aluminum chloride, and on the other hand dimethylethyldiethylsiloxalane $(CH_3)_2 (C_2H_5) Si\, O\, Al\, (C_2H_5)_2$, the atomic ratio Al/Ti being 3.

The polymers obtained have been characterized according to the manner set forth in Examples 1 and 2. A supplementary characteristic is indicated in Table III: it is called superior order average molecular weight $M_z$. The molecular weight distribution C(M) being experimentally achieved by gel permeation chromatography, $M_z$ is defined by the relation:

$$M_z = \frac{\int_0^\infty M^2 \cdot C(M)\, dM}{\int_0^\infty M \cdot C(M)\, dM}$$

EXAMPLES 9 TO 12

Ethylene is polymerized under conditions identical to those of Examples 7 and 8. However, an injection device like that shown in the FIGURE is used for injecting into zone 1 of the reactor a complexing agent C, the nature and molar ratio to titanium (noted c/b) of which are indicated in Table IV.

The polymers obtained have been characterized according to the manner set forth in Examples 7 and 8. It will be noticed that, every polymerization condition being otherwise identical, the separate injection of complexing agents according to the invention permits decreasing B and increasing $M_z$ by 45 to 220 percent.

TABLE I

| Example | T °C. | h % | MI | $\rho$ | $M_w$ | Mw/Mn | B % |
|---|---|---|---|---|---|---|---|
| 1 | 250 | 0.2 | 1.3 | 0.961 | 94,500 | 17.9 | 21.4 |
| 2 | 280 | 0.1 | 4.0 | 0.949 | 57,000 | 15.8 | 33.1 |

TABLE II

| Example | T °C. | h % | c | c/b | MI | $\rho$ | $M_w$ | Mw/Mn | B % |
|---|---|---|---|---|---|---|---|---|---|
| 3 | 250 | 0.2 | Mg(OC$_2$H$_5$)$_2$ | 0.46 | 0.47 | 0.960 | 127,500 | 10.9 | 11.2 |
| 4 | 280 | 0.1 | Mg(OC$_2$H$_5$)$_2$ | 0.46 | 1.2 | 0.943 | 92,600 | 17.5 | 20.0 |
| 5 | 250 | 0.2 | Ti(OC$_3$H$_7$)$_4$ | 0.4 | 0.55 | 0.959 | 126,000 | 12.2 | 10.4 |
| 6 | 250 | 0.2 | C$_{18}$H$_{37}$OH | 0.26 | 0.17 | 0.960 | 129,000 | 10.5 | 9.2 |

TABLE III

| Example | h % | $T_1$ | $T_2$ | $T_3$ | MI | $\rho$ | $M_w$ | $M_z$ | B % |
|---|---|---|---|---|---|---|---|---|---|
| 7 | 0.2 | 240 | 235 | 260 | 0.8 | 0.962 | 130,000 | 420,000 | 8.4 |
| 8 | 0.1 | 240 | 235 | 290 | 0.6 | 0.961 | 145,000 | 500,000 | 11.2 |

TABLE IV

| Example | h % | $T_1$ | $T_2$ | $T_3$ | C | $\frac{c}{b}$ | MI | $\rho$ | Mw | Mz | B % |
|---|---|---|---|---|---|---|---|---|---|---|---|
| 9 | 0.10 | 240 | 235 | 290 | $Ti(OC_3H_7)_4$ | 0.2 | 0.2 | 0.959 | 150,000 | 720,000 | 9.5 |
| 10 | 0.15 | 240 | 235 | 290 | $Mg(OC_2H_5)_2$ | 3.4 | 0.1 | 0.960 | 192,000 | 1300,000 | 5.0 |
| 11 | 0.30 | 240 | 245 | 260 | dimethylsiloxane | 1.5 | 0.1 | 0.958 | 190,000 | 1360,000 | 9.2 |
| 12 | 0.30 | 240 | 245 | 270 | dimethylsiloxane | 1.0 | 0.2 | 0.960 | 188,000 | 1000,000 | 10.0 |

It will be apparent to those skilled in the art that various modifications and variations could be made in the polymerization process of the invention without departing from the scope or spirit of the invention.

I claim:

1. A continuous process for polymerizing ethylene under a pressure of 600 to 2,000 bars and a temperature of 200° to 300° C., in at least one reactor comprising at least one reaction zone, by means of a catalytic system comprising (a) an activator selected from trialkylaluminums and alkylsiloxalanes, and (b) a compound comprising titanium trichloride, wherein a complexing agent (c) is injected into the reaction zone from a first supply source and said compound (b) is injected from a separate supply source whereby components (b) and (c) do not contact one another until substantially the time they are injected into the reaction zone but immediately contact one another at substantially the time of injection into the reaction zone and the concentration of complexing agent (c) in the reaction zone may be adjusted independently from the concentration of (b) in the same reaction zone, the ratio of the molar flow rate of (c) to the molar flow rate of titanium being between 0.15 and 4, said complexing agent being selected from silicone oils and from compounds having the formula $X(OR)_n$, wherein X is hydrogen or a metal, n is the valence of X, and R is an alkyl radical of up to 20 carbon atoms, the residence time of ethylene in the reaction zone being between 1 and 120 seconds.

2. A process according to claim 1, wherein the feeding line of (c) terminates in said reaction zone concentrically to the feeding line of (b).

3. A process according to claim 1, wherein the silicone oil is selected from alkylsilicates, alkyl- and arylsiloxanes, and alkylcyclosiloxanes.

4. A process according to claim 1, wherein polymerization is effected in the presence of up to 60 percent by weight of an inert diluent such as a hydrocarbon.

5. A process according to claim 1, wherein polymerization is effected in the presence of a chain transfer agent.

6. A process according to claim 1, wherein X is hydrogen.

7. A process according to claim 1, wherein X is magnesium.

8. A process according to claim 7, wherein said compound having the formula $X(OR)_n$ is $Mg(OC_2H_5)_2$.

* * * * *